United States Patent Office 3,652,462
Patented Mar. 28, 1972

3,652,462
PROCESS FOR PRODUCING SODIUM TUNGSTEN BRONZES
Till J. N. Peters, Towanda, and John A. Powers, New Albany, Pa., assignors to Sylvania Electric Products Inc.
No Drawing. Filed Oct. 8, 1970, Ser. No. 79,317
Int. Cl. H01b *1/06;* C01g *5/00;* C22b *59/00*
U.S. Cl. 252—518    14 Claims

ABSTRACT OF THE DISCLOSURE

A process for manufacturing sodium tungsten bronzes whereby finely divided pure tungsten oxide, sodium tungstate, and tungsten powder are blended, gassed with an inert gas, and heat treated in an inert gas atmosphere under specific conditions for a predetermined length of time.

BACKGROUND OF THE INVENTION

Field of the invention

This invention pertains to sodium tungsten bronzes. More particularly, this invention pertains to an improved process for manufacturing sodium tungsten bronzes which have a small particle size and are essentially free of metallic tungsten.

Prior art

The preparation of sodium tungsten bronzes was first reported by Wohler in 1823, using hydrogen reduction of a sodium tungstate melt. In 1851, the reduction of molten sodium tungstate with reducing agents such as tin, zinc, iron, and phosphorus was used to prepare bronzes. Reduction of molten sodium tungstate by metallic tungsten is a third method reported for making bronzes. Although bronzes can be obtained by the heretofore-mentioned processes, the products are often contaminated with metallic tungsten which requires post treatment to remove. The most common post treatment is the washing of the product with sodium hydroxide solution, which in turn generally oxidizes the product. These methods also necessitate the use of large excesses of reagents resulting in unpredictable and mixtures of products. Another disadvantage is that the end product is usually in the form of large crystals which would necessitate grinding, under controlled conditions, to produce desired powder.

An additional method reacts tungsten, sodium tungstate, and tungstic oxide in vacuo for 500 hours at temperatures in excess of 500° C. in order to form sodium tungsten bronze in powder form.

Obvious disadvantages are the long reaction time at elevated temperatures, and the safety and scale-up problems encountered when sealed tube techniques are used for solid-state reactions.

It is believed, therefore, that a method for producing sodium tungsten bronzes that uses a flowing gas reactor rather than sealed tube techniques to produce ultra pure bronzes in the 100–200 micron particle size range in a relatively short reaction time is an advancement in the art.

SUMMARY OF THE INVENTION

In accordance with one aspect of this invention there is provided a process for producing sodium tungsten bronzes. The process comprises forming a solid reaction medium of finely divided pure tungsten oxide, sodium tungstate and tungsten powder in at least stoichiometric amount to form a sodium tungsten bronze and thereafter blending the reaction medium for at least about one hour. The blended reaction medium is then gassed with inert gas at ambient temperatures for at least about 4 hours before heat treating the reaction medium in an inert gas atmosphere at a temperature of at least about 400° C. for a minimum of 48 hours.

DESCRIPTION OF THE PREFERRED EMBODIMENTS

For a better understanding of the present invention, together with other and further objects, advantages and capabilities thereof, reference is made to the following disclosure and appended claims in connection with the above description of one of the aspects of the invention.

Referring now to the invention with greater particularity, the process for producing sodium tungsten bronzes is to heat treat, at a temperature of at least about 400° C. for a minimum of 48 hours, in a flowing inert gas atmosphere, well-blended, finely divided particles of pure sodium tungstate, tungstic oxide, and tungsten powder, which have been gassed with an inert gas. Further, the preparation of sodium tungsten bronzes is accomplished without the contamination of the final product with residual metallic tungsten or the formation of large crystals of sodium tungsten bronze. Rather, the final product, sodium tungsten bronze, is obtained as a powder having a particle size of from about 100 microns to about 300 microns. These bronzes are useful as transparent, electrically conductive coatings, conductive pigments in paints, fuel cell electrodes, and in semiconductor devices.

Finely divided pure tungsten oxide, sodium tungstate and tungsten powder are admixed to form a solid reaction medium to form sodium tungsten bronzes according to the following reaction:

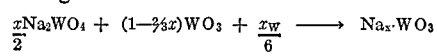

$$\frac{x}{2}Na_2WO_4 + (1-\tfrac{2}{3}x)WO_3 + \frac{xW}{6} \longrightarrow Na_xWO_3$$

where $x$ can be from about 0.3 to about 0.9. Based upon this equation the mole ratio of sodium tungstate:tungstic oxide:tungsten powder is from about 3:16:1 to about 3:2.67:1. By pure is meant the tungsten oxide and sodium tungstate are 99.9% pure and the tungsten powder is 99.99% pure. The particle size of the sodium tungstate and tungstic oxide should be such that 100% passes through a U.S.S. 325 mesh screen. It is also advantageous if the starting materials are thoroughly dried at about 115° C. for about 24 hours. The tungsten powder should have a particle size of not greater than about 0.90 micron. The finely divided particles are necessary to assure a complete reaction and a final product which is homogeneous in size and appearance.

The reaction medium is then blended for at least about 1 hour. When less than about 1 hour is used, a homogeneous reaction medium is not obtained which can result in mixtures of products. Times longer than about 72 hours can be used, but are generally avoided for economic reasons. Blending is generally provided by conventional means, such as, ball milling, V-blending, roll milling and the like. The length of time required will be dependent upon the type of blending used, availability of equipment, and other factors that will be obvious to those familiar with chemical processing equipment.

After blending, the reaction medium is gassed with inert gas at ambient temperatures for a minimum of about 4 hours. Argon or helium can be used, with helium being especially preferred because of its good heat-transfer properties. Nitrogen is usually avoided because of the possibility of forming nitrides. The gassing is generally done in the vessel in which the reaction medium will be heat treated. Thorough gassing of the vessel is necessary to remove all traces of nitrogen and oxygen, and preferably passes upwards through the reaction medium. If less than about 4 hours of gassing is used, traces of nitrogen or oxygen can remain and contaminate the final product.

The gassed reaction medium is then heat treated at a temperature of at least about 400° C. for a minimum of about 48 hours, while gassing with one of the aforementioned inert gasses. Although the heat treatment can be at a temperature range of from about 400° C. to about 600° C., and for about 48 hours to about 100 hours, depending on the temperature employed, temperatures of about 495° C. to about 505° C. for about 48 to 53 hours are preferred. Especially preferred is heat treating the reaction medium at a temperature of about 500° C. for about 50 hours. If temperatures below about 400° C. are used, an incomplete reaction occurs and the sodium tungsten bronze that is formed is contaminated, especially with metallic tungsten, which is difficult to remove. Further increases in temperature above about 600° C. do not appear to give any extension to the range in which a complete reaction occurs and as such are generally avoided.

Although longer times of heating can be used, that is, longer than about 100 hours, without adverse effects, they are generally avoided for economic reasons. When times below about 48 hours are used, an incomplete reaction can occur. Generally, shorter times, that is about 48 hours, can be used when higher temperatures, that is above 500° C. are used, and longer times are preferred when the lower temperature ranges are used. To more fully illustrate the present invention, the following detailed examples are presented. All parts, proportions and percentages are by weight unless otherwise given.

EXAMPLE 1

About 191.3 parts of sodium tungstate and about 230 parts tungstic oxide are separately pulverized to less than about 325 mesh and oven dried at about 115° C. for about 24 hours. About 39.9 parts tungsten powder is added to a mixture of the sodium tungstate and tungstic oxide and the entire mixture is blended on a roll mill for about 72 hours. About 111 parts of the mixture is then charged to a reaction vessel and gassed with argon for about 20 hours, at ambient temperature, at which time the furnace is turned on. After the charge has been heated in flowing argon at about 500° C. for about 45 hours, the furnace is turned off and is cooled to ambient temperature.

The resultant sodium tungsten bronze has a particle size of about 100 to about 300 microns. Powder X-ray diffraction analysis is performed and a least-squares fit of the measured positions of six diffraction lines gives a value of $x=0.71$. No free tungsten is detectable in the product.

EXAMPLE 2

Essentially the same procedure is followed as in Example 1, except that helium is used as the inert gas.

The resultant sodium tungsten bronze has a particle size of about 100 to about 300 microns. Powder X-ray diffraction analysis is performed and a least-squares fit of the measured positions of six diffraction lines gives a values of $x=0.71$. No free tungsten is detectable in the product.

While there has been shown and described what at present is considered the preferred embodiments of the invention, it will be obvious to one skilled in the art that various changes and modifications may be made therein without departing from the scope of the invention as defined by the appended claims.

We claim:

1. A process for the manufacture of sodium tungsten bronzes which comprises:
   (a) forming a solid reaction mediuim of finely divided pure tungsten oxide, sodium tungstate, and tungsten powder in stoichiometric amounts to form a sodium tungstate bronze,
   (b) blending said reaction medium for at least about 1 hour,
   (c) gassing said reaction medium with an inert gas for a minimum of about 4 hours at ambient temperature, and
   (d) heat treating said reaction medium in said inert gas atmosphere at a temperature of from at least about 400° C. to about 600° C. for a minimum of about 48 hours to form a finely divided sodium tungstate bronze free of metallic tungsten.

2. A process according to claim 1, wherein said finely divided tungsten oxide has a particle size such that 100% passes through a U.S.S. 325 mesh screen.

3. A process according to claim 1, wherein said finely divided sodium tungstate has a particle size such that 100% passes through a U.S.S. 325 mesh screen.

4. A process according to claim 1, wherein said finely divided tungsten powder has a particle size less than about 0.90 micron.

5. A process according to claim 1, wherein said blending is for about 1 hour to about 72 hours.

6. A process according to claim 1, wherein said gassing is for about 4 hours to about 30 hours.

7. A process according to claim 1, wherein said inert gas atmosphere is selected from the group consisting of argon and helium.

8. A process according to claim 7, wherein said inert gas atmosphere is argon.

9. A process according to claim 8, wherein said inert gas atmosphere is helium.

10. A process according to claim 1, wherein said heat treating is at a temperature of from about 400° C. to about 600° C.

11. A process according to claim 10, wherein said heat treating is for about 48 hours to about 100 hours.

12. A process according to claim 11, wherein said heat treating is conducted in a flowing-gas atmosphere.

13. A process according to claim 1, wherein said mole ratio of sodium tungstate:tungstic oxide:tungsten powder is from about 3:16:1 to about 3:2.67:1.

14. A process according to claim 1, wherein said sodium tungsten bronze has a particle size from about 100 microns to about 300 microns.

References Cited

Niedrach et al.: J. Electrochem. Soc., 1969, vol. 116, No. 1, pp. 152–3.

DOUGLAS J. DRUMMOND, Primary Examiner

U.S. Cl. X.R.

23—15 W, 51